United States Patent
Malik

(10) Patent No.: US 7,511,620 B2
(45) Date of Patent: Mar. 31, 2009

(54) METHODS AND APPARATUS FOR ANTENNA FAILOVER IN AN RFID SYSTEM WITH MULTI-ANTENNA ZONES

(75) Inventor: Ajay Malik, Santa Clara, CA (US)

(73) Assignee: Symbol Technologies, Inc., Holtsville, NY (US)

( * ) Notice: Subject to any disclaimer, the term of this patent is extended or adjusted under 35 U.S.C. 154(b) by 406 days.

(21) Appl. No.: 11/394,604

(22) Filed: Mar. 31, 2006

(65) Prior Publication Data

US 2007/0229275 A1    Oct. 4, 2007

(51) Int. Cl.
 *G08B 13/14* (2006.01)
(52) U.S. Cl. .................. 340/572.7; 340/572.1; 340/10.1
(58) Field of Classification Search .............. 340/572.1, 340/572.2, 10.1, 572.7, 10.3
See application file for complete search history.

(56) References Cited

U.S. PATENT DOCUMENTS 6,078,251 A * 6/2000 Landt et al. ............... 340/10.41
6,903,656 B1 * 6/2005 Lee .......................... 340/572.1
7,081,818 B2 * 7/2006 Eckstein et al. ........... 340/572.1
2007/0241906 A1 * 10/2007 Malik ....................... 340/572.7

* cited by examiner

*Primary Examiner*—Daryl C Pope

(57) ABSTRACT

An RFID system includes a central RF network controller and a failover antenna within a read point zone that spans multiple antennas and RFID readers. The system includes a first RFID antenna configured to read RF tag data within a first read point, a second RFID antenna configured to read the RF tag data within a second read point, and a failover RFID antenna. A controller communicatively coupled to the failover RFID antenna, the first RFID antenna, and the second RFID antenna is configured to group the first, second, and failover RFID antennas in a read point zone and to receive RF tag data from the first, second, and failover RFID antennas and assign the tag data to the read point zone. The controller is further configured to receive a failure notification associated with failure of one of the first and second RFID antennas and activate the failover RFID antenna upon receipt of the failure notification.

10 Claims, 2 Drawing Sheets

METHODS AND APPARATUS FOR ANTENNA FAILOVER IN AN RFID SYSTEM WITH MULTI-ANTENNA ZONES

TECHNICAL FIELD

The present invention relates generally to radio frequency identification (RFID) systems and, more particularly, to an improved RFID system with antenna failover.

BACKGROUND

Radio frequency identification (RFID) systems have achieved wide popularity in a number of applications, as they provide a cost-effective way to track the location of a large number of assets in real time. In large-scale application such as warehouses, retail spaces, and the like, many RFID tags may exist in the environment. Likewise, multiple RFID readers are typically distributed throughout the space in the form of entryway readers, conveyer-belt readers, mobile readers, etc.

Each reader typically includes one or more antennas. When an antenna fails, tags within the read point corresponding to that antenna cannot be read by the system. This reduces tag reader availability. To address this issue, prior art systems often include a spare antenna attached to a reader which is turned on only when another antenna attached to that reader fails. Since the antenna failure is local to a specific reader, only that reader knows about the failure. And since many applications may talk directly to the reader directly, the way the system handles antenna failure might be different for each application. As a result, the time necessary for knowledge of the failure to propagate through the network, and the performance of the corrective action, may vary greatly.

Accordingly, it is desirable to provide RFID systems that are capable of transparently handling the failure of an antenna in a multi-antenna system. Furthermore, other desirable features and characteristics of the present invention will become apparent from the subsequent detailed description and the appended claims, taken in conjunction with the accompanying drawings and the foregoing technical field and background.

BRIEF SUMMARY

An RFID system includes a central RF network controller and a failover antenna within a read point zone that spans multiple antennas and RFID readers. In one embodiment, the system includes a first RFID antenna configured to read RF tag data within a first read point, a second RFID antenna configured to read the RF tag data within a second read point, and a failover RFID antenna. A controller communicatively coupled to the failover RFID antenna, the first RFID antenna, and the second RFID antenna is configured to group the first, second, and failover RFID antennas in a read point zone and to receive RF tag data from the first, second, and failover RFID antennas and assign the tag data to the read point zone. The controller is further configured to receive a failure notification associated with failure of one of the first and second RFID antennas and activate the failover RFID antenna upon receipt of the failure notification.

BRIEF DESCRIPTION OF THE DRAWINGS

A more complete understanding of the present invention may be derived by referring to the detailed description and claims when considered in conjunction with the following figures, wherein like reference numbers refer to similar elements throughout the figures.

DETAILED DESCRIPTION

The following detailed description is merely illustrative in nature and is not intended to limit the invention or the application and uses of the invention. Furthermore, there is no intention to be bound by any express or implied theory presented in the preceding technical field, background, brief summary or the following detailed description.

The invention may be described herein in terms of functional and/or logical block components and various processing steps. It should be appreciated that such block components may be realized by any number of hardware, software, and/or firmware components configured to perform the specified functions. For example, an embodiment of the invention may employ various integrated circuit components, e.g., radio-frequency (RF) devices, memory elements, digital signal processing elements, logic elements, look-up tables, or the like, which may carry out a variety of functions under the control of one or more microprocessors or other control devices. In addition, those skilled in the art will appreciate that the present invention may be practiced in conjunction with any number of data transmission protocols and that the system described herein is merely one exemplary application for the invention.

For the sake of brevity, conventional techniques related to signal processing, data transmission, signaling, network control, RFID systems and specifications, and other functional aspects of the system (and the individual operating components of the system) may not be described in detail herein. Furthermore, the connecting lines shown in the various figures contained herein are intended to represent example functional relationships and/or physical couplings between the various elements. It should be noted that many alternative or additional functional relationships or physical connections may be present in a practical embodiment.

Figure 1:
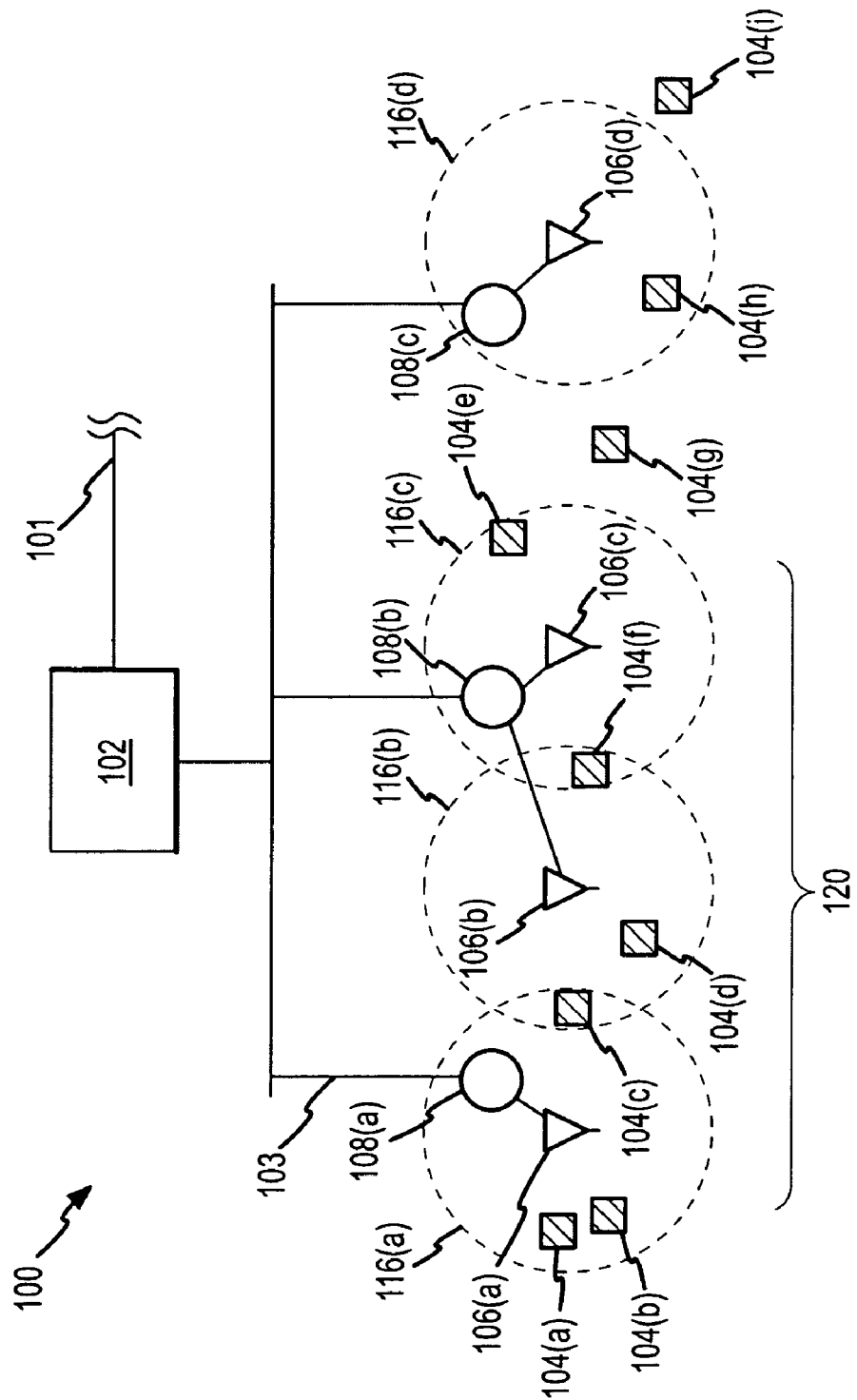
FIG. 1 is a conceptual overview of a RFID system in accordance with the present invention.

FIG. 1 depicts a simplified schematic of an exemplary RFID system 100 useful in describing the present invention. In general, a number of RFID tags (or simply "tags") 104 are distributed throughout the environment. These tags are read by a number of RFID readers (or simply "readers") 108 having one or more associated antennas 106 provided within the environment. Readers 108, each of which may be stationary or mobile, are suitably connective via wired or wireless data links 103 to a RF network controller ("RNC" or simply "controller") 102. Controller 102 will typically communicate over a larger network 101. As will be described further below, the system 100 may include one or more failover antennas (not shown in FIG. 1) configured to be activated by controller 102 in the event a failure notification is received from an associated reader.

A particular reader 108 may have multiple associated antennas 106. For example, as shown in FIG. 1, reader 108(a) is coupled to one antenna 106(a), reader 108(b) is coupled to two antennas 106(b) and 106(c), and reader 108(c) is coupled to one antenna 106(d). Reader 108 may incorporate additional functionality, such as filtering, cyclic-redundancy checks (CRC), and tag writing, as is known in the art.

In general, RFID tags (sometimes referred to as "transponders") may be classified as either active or passive. Active tags are devices that incorporate some form of power source (e.g., batteries, capacitors, or the like), while passive tags are tags that are energized via an RF energy source received from a nearby antenna. While active tags are more powerful, and exhibit a greater range than passive tags, they also have a shorter lifetime and are significantly more expensive. Such tags are well known in the art, and need not be described in detail herein.

Each antenna 106 has an associated RF range (or "read point") 116, which depends upon, among other things, the strength of the respective antenna 106. The read point 116 corresponds to the area around the antenna in which a tag 104 may be read by that antenna, and may be defined by a variety of shapes, depending upon the nature of the antenna (i.e., the RF range need not be circular or spherical as illustrated in FIG. 1).

It is not uncommon for the RF ranges or read points to overlap in real-world applications (e.g., doorways, small rooms, etc.). Thus, as shown in FIG. 1, read point 116(*a*) overlaps with read point 116(*b*), which itself overlaps with read point 116(*c*). Accordingly, it is possible for a tag to exist within the range of two or more readers simultaneously. For example, tag 104(*c*) falls within read points 116(*a*) and 116 (*b*), and tag 104(*f*) falls within read points 116(*b*) and 116(*c*). Because of this, two readers (108(*a*) and 108(*b*)) may sense the presence of (or other event associated with) tag 104(*c*).

Controller 102 includes hardware, software, and/or firmware capable of carrying out the functions described herein. Thus, host 102 may comprise one or more processors accompanied by storage units, displays, input/output devices, an operating system, database management software, networking software, and the like. Such systems are well known in the art, and need not be described in detail.

Controller 102 may be configured as a general purpose computer, a network switch, or any other such network host. In a preferred embodiment, controller 102 is modeled on a network switch architecture but includes RF network controller software (or "module") whose capabilities include, among other things, the ability to allow configure and monitor readers 108 and antennas 106.

In accordance with one aspect of the invention, controller 102 allows multiple read points 116 to be logically combined, via controller 102, within a single read point zone (or simply "zone"). For example, referring to FIG. 1, a read point zone 120 may be defined by the logical union of read points 116(*a*), 116(*b*), and 116(*c*). Note that the read points need not overlap in physical space, and that disjoint read points (e.g., read point 116(*d*)) may also be included in the read point zone if desired. In a preferred embodiment, antennas (i.e., read points defined by the antennas) can be arbitrarily assigned to zones, regardless of whether they are associated with the same reader. That is, referring to FIG. 1, antennas 106(*b*) and 106(*c*), while both associated with reader 108(*b*), may be part of different zones. Controller 102 then receives all tag data from readers 108 via respective data links 103 (e.g., wired communication links, 802.11 connections, or the like), then aggregates and filters this data based on zone information.

The read point zones are suitably preconfigured by a user or administrator. That is, the user is allowed to access controller 102 and, through a configuration mode, specify a set of read points that are to be included in a particular zone. Controller 102 includes a memory, which maintains a list specifying antennas, readers, and corresponding read point zones.

In one embodiment, the user accesses controller 102 through a suitable interface—for example, an HTML interface. The user then creates a new read point zone and assigns it a zone name. The user may then access host 102 and configure individual read points so that they are specified as part of a given zone.

When a reader 108 detects a tag event from a tag 104, the corresponding tag data is sent via data link 103 to host 102. In accordance with the present invention, controller 102 does not report (to applications running on network 101) multiple read events from the same tag within a read point zone. That is, as the read point zones span multiple antennas, there is no duplication of read information. As external applications (i.e., applications running on host computer within network 101) do not communicate with readers 108 directly, but rather through controller 102, the data traffic related to readers 108 is greatly reduced.

In accordance with one embodiment, controller 102 is configured to aggregate tags reported in same zone and send that aggregate information to one or more applications within network 101. The term "aggregate" as used herein includes, among other things, the ability to determine that multiple reads from the same tag, but different antennas, are within the same zone, and therefore need not be counted as separate events. Thus, aggregation might include sorting, filtering, and concatenation of tag data from defined read point zones, as well as any other conventional data operation. As a result, the aggregate information will typically be more compact that the raw tag data received by the various readers 108, thus reducing the volume of traffic communicated over network 101.

The controller may preferably makes use of the zone configurations as well as time-of-read of data to filter and report data. That is, controller 102 might receive the same tag data from two different antennas at approximately the same time. In such cases, if the time difference between read times is less than some preconfigured duration, controller 102 filters out the redundant information. The preconfigured duration may be selected based on any suitable criteria, including, for example, anticipated network speed, congestion level, etc. In one embodiment, this preconfigured duration is selectable by the user during a configuration step.

In accordance with the present invention, a failover antenna is provided within the system. The failover antenna is activated upon receipt of a failure notification received by the controller and may be configured in accordance with a set of failover conditions.

Figure 2:
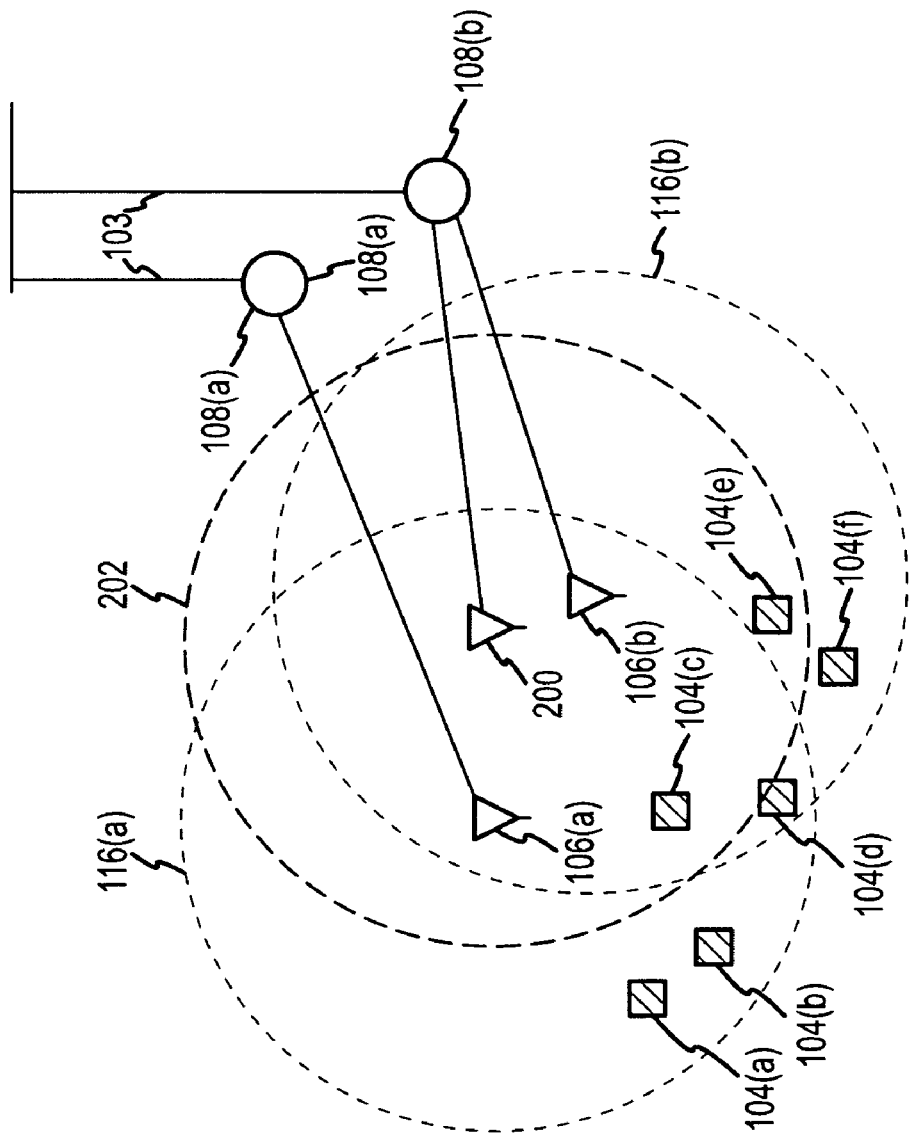
FIG. 2 is a conceptual overview of an exemplary read point zone in accordance with the invention.

In this regard, FIG. 2 depicts an example conceptual overview of a read point zone including two antennas and a failover antenna. More particularly, antenna 106(*a*) is connected to reader 108(*a*), and antenna 106(*b*) is connected to reader 108(*b*). Antennas 106(*a*) and 106(*b*) will normally be in an activated state, receiving and transmitting tag data from an assortment of tags 104. As will be apparent, tags 104 may be read by reader 106(*a*) and/or 106(*b*), depending upon the position of the tag with respect to the corresponding read points 116(*a*) and 116(*b*).

A failover antenna 200 having a corresponding read point 202 is also provided. In this embodiment, failover antenna 200 is connected to reader 108(*b*), and has a read point (RF range) that intersects both read points 116(*a*) and 116(*b*). Failover antenna 200 may be strategically placed to cover certain important areas, or to intersect one ore more particular read points. It will be understood, however, that this geometry is merely an example, and that the antennas 106 and read points 116 may have any arbitrary configuration. Furthermore, the centers as well as the diameters and shapes of the read points may vary from reader to reader.

In accordance with one embodiment, failover antenna 200, during normal operation, will be in an "unactivated" state. That is, it will not receive and transmit tag information for tags within its read point 202. In this unactivated state, it may be powered off, powered on but in standby mode, in a sleep mode, or in any other suitable mode.

Each reader 108 is capable of determining whether its corresponding antennas 106 are operating correctly. Such antenna monitoring methods are well known in the art, and need not be described herein. If a reader 108 determines that an antenna has lost functionality, or has otherwise failed, it produces a failure notification and sends the notification out over the network 103 to controller 102. This failure notification may take any convenient form.

When controller 102 receives the failure notification, it takes corrective action in accordance with one or more predetermined failure conditions, which may be set by default and/or configured by a technician or user via some form of user interface as described above.

For example, a simple corrective action would involve simply activating antenna 208 of reader 108(b) such that it could begin to receive and send tag data from within read point 202. This activation would typically be accomplished by reader 108(b) in response to a request from controller 102.

It will be appreciated that, by including one or more failover antennas within a zone, a failover antenna belonging to one RFID reader may be activated to self-heal an antenna belonging to another RFID reader. Thus, antennas can be healed across multiple readers. As the controller 102 handles all communication from readers 108 to any external applications, the self-healing of the zone is efficient and consistent.

The failure conditions might specify that failover antenna 200 be activated in the event a single antenna (e.g., antenna 106(a)) fails, or if either antenna 106(a) or 106(b) fails. Indeed, the failure conditions might specify that the entire system be reconfigured with different read point zone settings and the like.

An external application communicating with controller 102 may itself specify the corrective action to be taken. That is, in the event that the system must be reconfigured with different zone assignments, it is possible for the external application to control this reconfiguration.

It should be appreciated that the example embodiment or embodiments described herein are not intended to limit the scope, applicability, or configuration of the invention in any way. Rather, the foregoing detailed description will provide those skilled in the art with a convenient road map for implementing the described embodiment or embodiments. It should be understood that various changes can be made in the function and arrangement of elements without departing from the scope of the invention as set forth in the appended claims and the legal equivalents thereof.

What is claimed is:

1. An radio-frequency identification (RFID) system comprising:
    a first RFID antenna, the first antenna configured to read RF tag data within a first read point;
    a second RFID antenna, the second antenna configured to read the RF tag data within a second read point;
    a failover RFID antenna, and
    a controller communicatively coupled to the failover RFID antenna, the first RFID antenna, and the second RFID antenna, the controller configured to group the first, second, and failover RFID antennas in a read point zone and to receive RF tag data from the first, second, and failover RFID antennas and assign the tag data to the read point zone;
    the controller further configured to receive a failure notification associated with failure of one of the first and second RFID antennas and activate the failover RFID antenna upon receipt of the failure notification.

2. The RFID system of claim 1, wherein the first, second, and failover antennas are coupled to a single RFID reader coupled to the controller.

3. The RFID system of claim 1, wherein the first RFID antenna is coupled to a first RFID reader, and wherein the second RFID antenna and the failover antenna are coupled to a second RFID reader.

4. The RFID system of claim 1, wherein the controller is coupled to an RFID application over a network.

5. The RFID system of 4, wherein the controller is configured to produce aggregated information from the tag data from the read point zone and transmit the aggregated information to the RFID application.

6. The RFID system of claim 1, wherein the controller further includes a user interface configured to allow a user to create the read point zone and assign the first, second, and failover RFID antennas to the read point zone.

7. A method of processing radio-frequency identification (RFID) tag information comprising:
    providing a first RFID antenna having a first read point, and a second RFID antenna having a second read point;
    providing a failover RFID antenna having a third read point intersecting the first read point;
    providing a controller communicatively coupled to the first, second, and failover RFID antennas;
    configuring the controller to assign the first RFID antenna, the second RFID antenna, and the failover RFID antenna to a read point zone;
    receiving a failure notification indicative of failure of the first RFID antenna;
    activating the failover RFID antenna in accordance with a set of failover conditions;
    receiving, from the failover RFID antenna, a first signal from an RFID tag;
    receiving from the second RFID antenna, a second signal from the RFID tag;
    aggregating, via the controller, the first and second signals and attributing the first and second signals to the read point zone.

8. The method of claim 7, wherein the controller is configured to produce aggregated information from the tag data from the read point zone and transmit the aggregated information to an RFID application over a network.

9. The method of claim 7, farther including the step of specifying the set of failover conditions via a user interface.

10. The method of claim 9, wherein the first RFID antenna is connected to a first RFID reader, the second RFID antenna is connected to a second RFID reader, and the failover RFID antenna is connected to the second RFID reader, and wherein specifying the set of failover conditions includes specifying that the failover RFID antenna should be activated in the event that the failure notification is received from the first RFID reader.

* * * * *

UNITED STATES PATENT AND TRADEMARK OFFICE
CERTIFICATE OF CORRECTION

| | |
|---|---|
| PATENT NO. | : 7,511,620 B2 |
| APPLICATION NO. | : 11/394604 |
| DATED | : March 31, 2009 |
| INVENTOR(S) | : Malik |

It is certified that error appears in the above-identified patent and that said Letters Patent is hereby corrected as shown below:

In Column 6, Line 17, in Claim 5, delete "of 4," and insert -- of claim 4, --, therefor.

In Column 6, Line 51, in Claim 9, delete "farther" and insert -- further --, therefor.

Signed and Sealed this

Sixteenth Day of February, 2010

David J. Kappos
*Director of the United States Patent and Trademark Office*